(12) United States Patent
McKee

(10) Patent No.: US 9,730,552 B2
(45) Date of Patent: *Aug. 15, 2017

(54) OVEN CAVITY TEMPERATURE LOWERING BY FORCED AIR

(71) Applicant: Ovention, Inc., Milwaukee, WI (US)

(72) Inventor: Philip R. McKee, Frisco, TX (US)

(73) Assignee: Ovention, Inc., Milwaukee, WI (US)

( * ) Notice: Subject to any disclaimer, the term of this patent is extended or adjusted under 35 U.S.C. 154(b) by 519 days.

This patent is subject to a terminal disclaimer.

(21) Appl. No.: 14/248,876

(22) Filed: Apr. 9, 2014

(65) Prior Publication Data

US 2014/0217083 A1    Aug. 7, 2014

Related U.S. Application Data

(60) Division of application No. 13/774,617, filed on Feb. 22, 2013, now Pat. No. 8,746,134, which is a
(Continued)

(51) Int. Cl.
*A47J 37/04*    (2006.01)
*F24C 15/32*    (2006.01)
(Continued)

(52) U.S. Cl.
CPC .............. *A47J 37/044* (2013.01); *A21B 1/42* (2013.01); *A47J 27/62* (2013.01); *F24C 15/322* (2013.01)

(58) Field of Classification Search
CPC .... A21B 1/00; A21B 1/42; A21B 1/46; A21B 1/48; A21B 1/50; A47J 27/62; A47J 37/04; A47J 37/044; A47J 37/045; A47J 37/046
(Continued)

(56) References Cited

U.S. PATENT DOCUMENTS 3,910,175 A    10/1975  Smith
4,244,284 A *  1/1981   Flavan, Jr. ............... H05B 3/00
                                                       219/383
(Continued)

FOREIGN PATENT DOCUMENTS

CN    1301477 A    6/2001

OTHER PUBLICATIONS

European Patent Office, Supplementary European Search Report, EP 12 83 4264, Mar. 19, 2015.
(Continued)

*Primary Examiner* — Dana Ross
*Assistant Examiner* — Brandon Harvey
(74) *Attorney, Agent, or Firm* — Quarles & Brady LLP

(57)    ABSTRACT

A matchbox oven is disclosed. The matchbox oven includes a housing, a slider, a mover, a heat source and a blower. The housing includes a cavity having two openings. The mover moves the slider in and out of the cavity through the two openings. The heat source provides heat to the cavity for heating up any food item placed within the cavity. The slider includes multiple stoppers to serve as oven covers for preventing heat within the cavity from escaping through the two openings. The slider can also be utilized as a heat sink for lowering the cavity's temperature during oven operation. When a new cook temperature is substantially lower than the temperature of the cavity, the blower forces heated air within the cavity to exit through the two openings before the starting of and/or during the initial portion of a new cook cycle.

21 Claims, 6 Drawing Sheets

Related U.S. Application Data continuation of application No. 13/236,695, filed on Sep. 20, 2011, now Pat. No. 8,733,236.

(51) Int. Cl.
  *A47J 27/62* (2006.01)
  *A21B 1/42* (2006.01)

(58) Field of Classification Search
  USPC ..... 99/385, 36, 393, 401, 443 R, 443 C, 467
  See application file for complete search history.

(56) References Cited

U.S. PATENT DOCUMENTS

| | | |
|---|---|---|
| 4,556,043 A | 12/1985 | Bratton |
| 5,153,402 A | 10/1992 | Quick et al. |
| 5,277,105 A | 1/1994 | Bruno et al. |
| 5,717,192 A | 2/1998 | Dobie et al. |
| 5,771,786 A | 6/1998 | Chung |
| 5,826,496 A | 10/1998 | Jara |
| 6,140,626 A | 10/2000 | McKee et al. |
| 6,369,360 B1 | 4/2002 | Cook |
| RE37,706 E | 5/2002 | Chung |
| 6,541,739 B2 | 4/2003 | Shei et al. |
| 6,880,545 B2 | 4/2005 | Heber et al. |
| 7,004,159 B1 | 2/2006 | Carpenter et al. |
| 7,381,927 B1 | 6/2008 | Agnello |
| 8,733,236 B2 | 5/2014 | McKee |
| 8,746,134 B2 | 6/2014 | McKee |
| 9,288,997 B2 | 3/2016 | McKee |
| 2002/0121509 A1 | 9/2002 | Shei et al. |
| 2004/0144260 A1 | 7/2004 | Backus et al. |
| 2004/0231526 A1 | 11/2004 | Childress |
| 2005/0132899 A1 | 6/2005 | Huang et al. |
| 2005/0205547 A1 | 9/2005 | Wenzel |
| 2005/0235836 A1 | 10/2005 | Knost et al. |
| 2007/0137633 A1 | 6/2007 | McFadden |
| 2007/0295325 A1 | 12/2007 | Esparza et al. |
| 2008/0067166 A1 | 3/2008 | Yoder |
| 2008/0156201 A1 | 7/2008 | Cook |
| 2008/0216812 A1 | 9/2008 | Dougherty |
| 2009/0090252 A1 | 4/2009 | Ewald et al. |
| 2010/0319551 A1* | 12/2010 | Cox .................. F23N 1/045 99/443 C |
| 2011/0114634 A1 | 5/2011 | Nevarez |
| 2012/0247445 A1 | 10/2012 | McKee |
| 2013/0213380 A1 | 8/2013 | McKee |

OTHER PUBLICATIONS

PCT International Search Report, PCT/US2012/051276, Feb. 11, 2012.

* cited by examiner

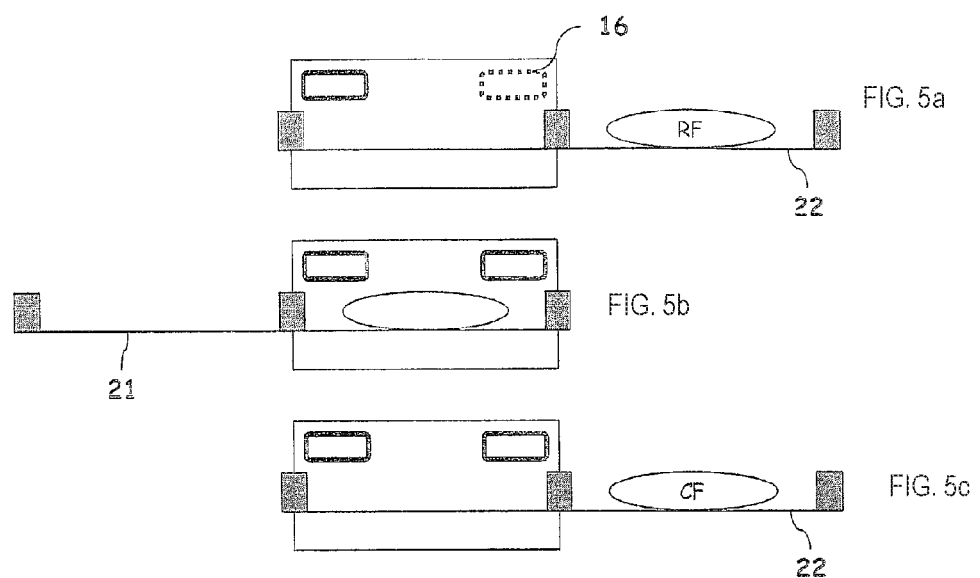

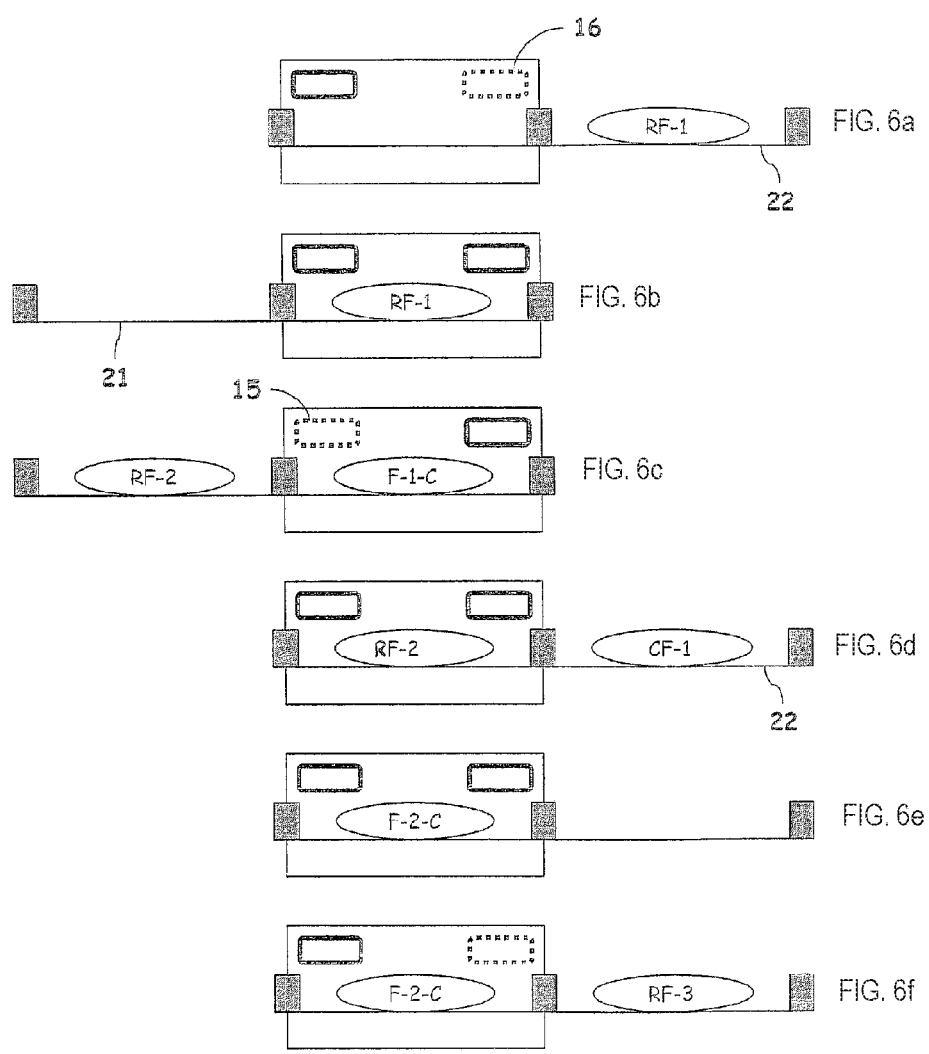

OVEN CAVITY TEMPERATURE LOWERING BY FORCED AIR

CROSS-REFERENCE TO RELATED APPLICATIONS

This patent application is a division of U.S. application Ser. No. 13/774,617 filed on Feb. 22, 2013, which was a continuation of U.S. application Ser. No. 13/236,695, filed on Sep. 20, 2011, the pertinent parts of which are incorporated by reference herein.

STATEMENT REGARDING FEDERALLY SPONSORED RESEARCH OR DEVELOPMENT

Not Applicable

BACKGROUND OF THE INVENTION

1. Field of the Invention

The present invention relates to ovens in general, and in particular to a matchbox oven capable of providing continuous food cooking while minimizing heat loss.

2. Description of the Related Art

A conveyor oven typically has a first opening through which uncooked food enters and a second opening at the opposite end of the oven through which cooked food exits. A stainless steel conveyor belt is commonly used to carry food items through a heated cavity between the first and second openings. The conveyor belt extends past both openings sufficiently to allow safe insertion and retrieval of food items. This arrangement allows food items to be placed on the conveyor belt on a continuous basis to achieve sequential steady-state cooking.

When food items offered by a commercial foodservice operation such as a restaurant are to be cooked at the same heat transfer profile for the same amount of time, a conveyor oven is particularly advantageous. A foodservice personnel needs only set the temperature, blower speed and conveyor belt speed as necessary to cook the selected foods. After the above-mentioned three parameters have been set, the conveyor oven can be operated continuously without any further adjustments. As such, even a person unskilled in the art of cooking is able to prepare high-quality cooked food products simply by placing them on the conveyor belt of a conveyor oven. The ease of operation and high throughput make conveyor ovens highly desirable in restaurants and other commercial foodservice settings.

However, conveyor ovens also have their disadvantages. For example, most commercial foodservice operations offer a variety of food items, such as pizza, chicken, vegetables and pies. Even a single food order at a restaurant may include multiple types of food items. Conveyor ovens are very efficient when cooking similar food items, but not so for cooking a variety of food items that require vastly different cooking times and heat transfer profiles. In addition, conveyer ovens are not very energy efficient because the two openings allow tremendous heat loss during their operation, and the lost heat must be replaced in order to maintain a steady cooking temperature. Furthermore, the heat that escapes from conveyor ovens must be extracted, typically via an air conditioning system, so that the ambient temperature of the kitchen area in which the conveyor ovens reside does not increase beyond an uncomfortable level for foodservice personnel. All of the above adds to the cost of foodservice operations when using conveyor ovens.

Consequently, it would be desirable to provide a flexible oven that is energy-efficient as well as operationally efficient.

SUMMARY OF THE INVENTION

In accordance with one embodiment of the present invention, a matchbox oven includes a housing, a slider, a mover and a heat source. The housing includes a cavity having a first and second openings. The mover moves the slider in and out of the cavity through the first and second openings. The heat source provides heat to the cavity for heating up any food item placed on a portion of the slider located within the cavity. The slider, which is configured to receive food items, includes multiple stoppers to serve as oven covers for preventing heat within the cavity from escaping through the first and second openings. When necessary, a portion of the slider can also be utilized as a heat sink for lowering the temperature in the cavity during oven operation. In addition, the matchbox oven includes a blower for forcing heated air within the cavity to exit through the first and second openings before starting a new cook cycle and/or during the initial portion of a new cook cycle when a new cook temperature is substantially lower than the temperature in the cavity.

All features and advantages of the present invention will become apparent in the following detailed written description.

BRIEF DESCRIPTION OF THE DRAWINGS

The invention itself, as well as a mode of use, further objects, and advantages thereof, will best be understood by reference to the following detailed description of an illustrative embodiment when read in conjunction with the accompanying drawings, wherein:

FIGS. 5a-5c illustrate a method of cooking when only one of food loading sections of the matchbox oven from FIG. 1 is being used;

FIGS. 6a-6f illustrate a method of cooking when both food loading sections of the matchbox oven from FIG. 1 are being used.

DETAILED DESCRIPTION OF THE INVENTION

Figure 1:
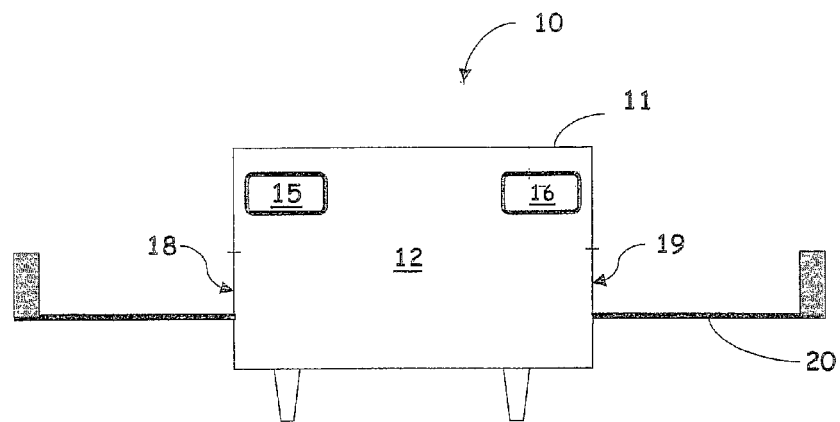
FIG. 1 is a front view of a matchbox oven, in accordance with an embodiment of the present invention.

Referring now to the drawings and in particular to FIG. 1, there is depicted a front view of a matchbox oven, in accordance with an exemplary embodiment of the present invention. As shown, a matchbox oven 10 is defined by a housing 11 having a cavity 12. Housing 11, as well as cavity 12, has a first opening 18 and a second opening 19. Matchbox oven 10 includes a heating and airflow system (not shown) to supply heat to cavity 12 for heating up any food items that have been carried into cavity 12 through either first opening 18 or second opening 19 via a slider 20.

Matchbox oven 10 also includes a first control panel 15 and a second control panel 16. An operator can enter operating parameters, such as cooking temperature, cooking time, blower speed, etc., via first and second control panels 15, 16 to effectuate cooking controls on any food items placed within cavity 12. First and second control panels 15, 16 are preferably implemented with touchscreens but they can also be implemented with keypads and liquid crystal displays (LCDs).

Figure 2:
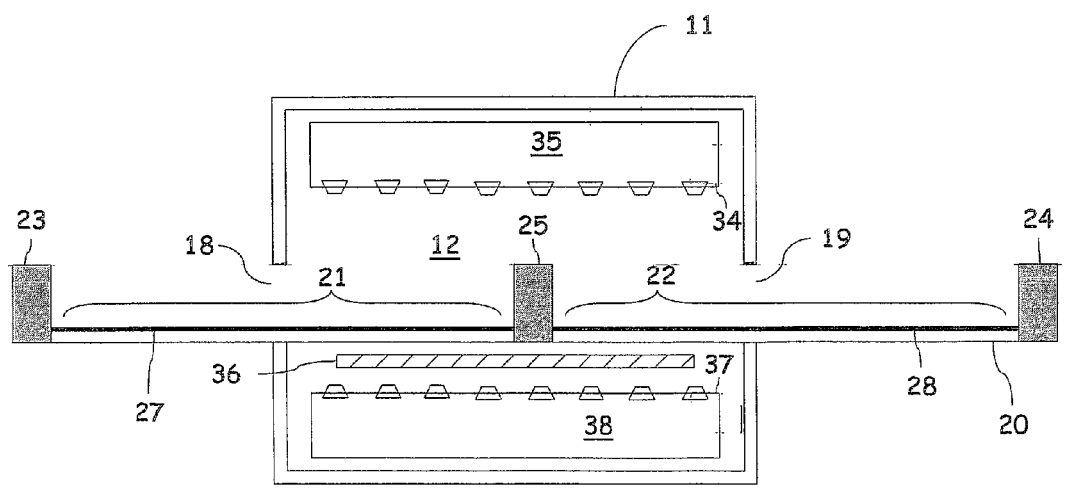
FIG. 2 is a cross-sectional view of a cavity within the matchbox oven from FIG. 1.

With reference now to FIG. 2, there is depicted a cross-sectional view of housing 11 that accommodates slider 20 having a first food loading section 21 and a second food loading section 22. The surfaces of first and second food loading sections 21, 22 are substantially planar. First and second food loading sections 21, 22 are configured to receive cooking plates 27, 28, respectively. Any food item intended to be cooked by matchbox oven 10 is initially placed on either one of cooking plates 27, 28. Cooking plates 27, 28 can be identical or different from each other, depending on the types of food items to be prepared. Thus, cooking plate 27 may be made of a different material and/or a different design from cooking plate 28.

Preferably, operating parameters for matchbox oven 10 to cook any food items placed on the first food loading section 21 to be carried into cavity 12 through first opening 18 can be entered at first control panel 15 (from FIG. 1). Similarly, operating parameters for matchbox oven 10 to cook any food items placed on food loading section 22 to be carried into cavity 12 through second opening 19 can be entered at second control panel 16 (from FIG. 1).

When food loading section 21 is located inside cavity 12 where food is being cooked, food loading section 22 is located outside housing 11 where it is being cooled by the ambient air of a kitchen in which matchbox oven 10 resides. Similarly, when food loading section 22 is located inside cavity 12 where food is being cooked, food loading section 21 is located outside housing 11 where it is being cooled by the ambient air of the kitchen in which matchbox oven 10 resides. Due to the large temperature differential between the cooled food loading section 21 (or food loading section 22) and cavity 12, food loading section 21 (or food loading section 22) can be sent into cavity 12 to rapidly bring down the temperature of cavity 12, when necessary, after food loading section 21 (or food loading section 22) has been sufficiently cooled down by the ambient air. In essence, the air-cooled food loading section 21 (or food loading section 22) serves as a heat sink for absorbing the heat within cavity 12. From a time-saving standpoint, this maneuver is particularly advantageous in getting matchbox oven 10 ready for cooking a food item that requires a lower cooking temperature than the current temperature of cavity 12. This is because it takes less time to raise the temperature of cavity 12 up to the desired temperature by the heating and airflow system (after the cavity's current temperature has been lowered by one of food loading sections 21-22) than to lower the cavity's current temperature down to the desired temperature by allowing heat to escape from cavity 12.

Slider 20 also includes a first stopper 23, a second stopper 24 and a third stopper 25. Third stopper 25 serves as a divider between first and second food loading sections 21, 22 as well as an oven cover to prevent heat within cavity 12 from escaping through openings 18, 19. Along with third stopper 25, first and second stoppers 23, 24 serve as oven covers to prevent heat within cavity 12 from escaping through openings 18, 19, depending on the placement of slider 20 in relation to cavity 12. For example, first and third stoppers 23, 25 can serve as oven covers for first and second openings 18, 19, respectively. Similarly, third and second stoppers 25, 24 can serve as oven covers for first and second openings 18, 19, respectively.

Slider 20 is connected to a stepper motor (not shown) that powers the linear movement of slider 20 in and out of cavity 12. Although slider 20 is moved by a stepper motor, it is understood by those skilled in the art that slider 20 can also be moved manually via a lever system or by a variety of other motorized movement designs.

In addition, housing 11 also contains a top plenum 35 and a bottom plenum 38. Top plenum 35 is connected to a top nozzle plate 34. Bottom plenum 38 is connected to a bottom nozzle plate 37. Top nozzle plate 34, top plenum 35, bottom nozzle plate 37 and bottom plenum 38 are part of the heating and airflow system for matchbox oven 10 such that heated air in top plenum 35 and bottom plenum 38 are in gaseous communication with cavity 12 through top nozzle plate 34 and bottom nozzle plate 37, respectively. Top nozzle plate 34 and bottom nozzle plate 37 include multiple conical shape nozzles for directing hot pressured airstream towards any food items placed on the portion of slider 20 located within cavity 12. Although air passes through top nozzle plate 34 and bottom nozzle plate 37 into cavity 12, it is understood by those skilled in the art that top plenum 35 and/or bottom plenum 38 could be in gaseous communication with cavity 12 via a variety of air opening configurations such as tubes, rectangular openings and the like, and that air could enter cavity 12 through only one of the top plenum 35 or bottom plenum 38.

For additional heating, an optional infrared radiation heating element 36 can be placed within cavity 12 somewhere between slider 20 and bottom nozzle plate 37 or between slider 20 and top nozzle plate 34 for supplying heat towards any food located on first food loading section 21 or second loading section 22 of slider 20. It is understood by those skilled in the art that other heating elements, such as microwave, steam or a combination thereof, can be used instead of infrared radiation heating element 36.

Figure 3:
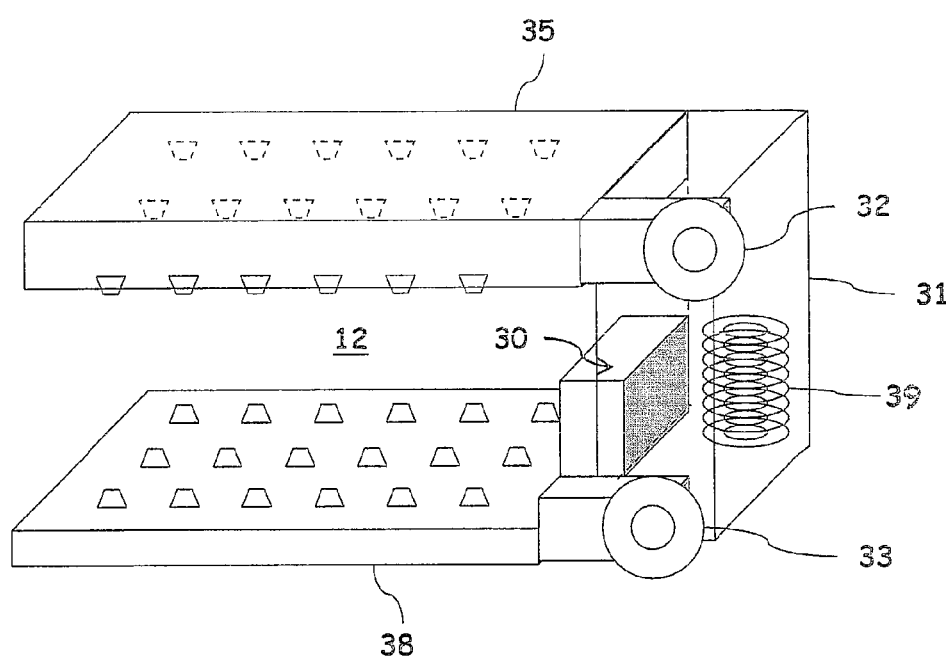
FIG. 3 is a diagram of a heating and airflow system within the matchbox oven from FIG. 1.

Referring now to FIG. 3, there is depicted a diagram of the heating and airflow system within matchbox oven 10. Air within cavity 12 is initially pumped in to a heater plenum 31 via an intake opening 30. Heater plenum 31 includes a heater 39. After it has been sufficiently heated by heater 39, the hot air is then directed to top plenum 35 via a top blower 32 and to bottom plenum 38 via a bottom blower 33. The pressurized hot air formed within top plenum 35 is subsequently directed to cavity 12 via multiple nozzles located on top nozzle plate 34 (from FIG. 2). Similarly, pressurized hot air formed within bottom plenum 38 is subsequently directed to cavity 12 via multiple nozzles located on bottom nozzle plate 37 (from FIG. 2). Although heated air is shown to be sent to top air plenum 35 and bottom air plenum 38 via separate blowers, it is understood by those skilled in the art that heated air can be sent to both top plenum 35 and bottom plenum 38 via a single blower.

Figure 4A:
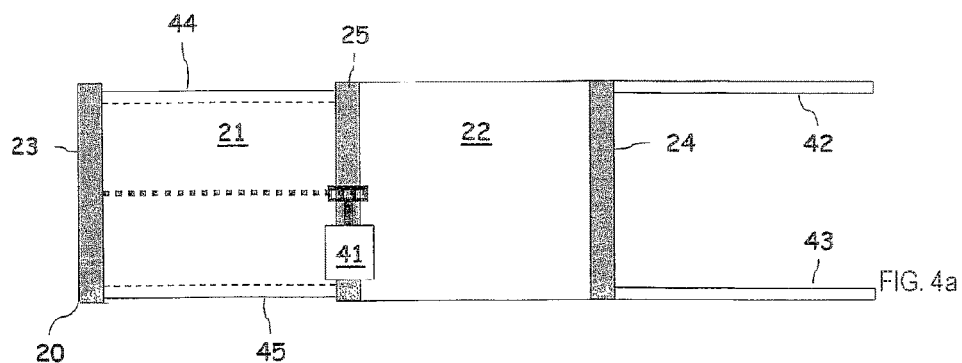
FIGS. 4a-4c are a top view and side views of the slider within the matchbox oven from FIG. 1.

With reference now to FIG. 4a, there is depicted a top view of the slider 20, which includes first and second food loading sections 21-22 and stoppers 23-25, is supported by a first pair of rails 42, 43 and a second pair of rails 44, 45. The linear movement of slider 20 on top of rails 42-45 is preferably powered by a stepper motor 41. The widths of stoppers 23-25, which are preferably the same, are wider than the thickness of openings 18, 19. Thus, two of stoppers 23-25 can serve as oven covers to prevent heat within cavity 12 from escaping through openings 18, 19, depending on the placement of slider 20 in relation to cavity 12. Although three stoppers 23-25 on the exemplary slider, it is possible to employ less than three stoppers on slider 20 at the expense of a higher heat loss from cavity 12.

Figure 4B:
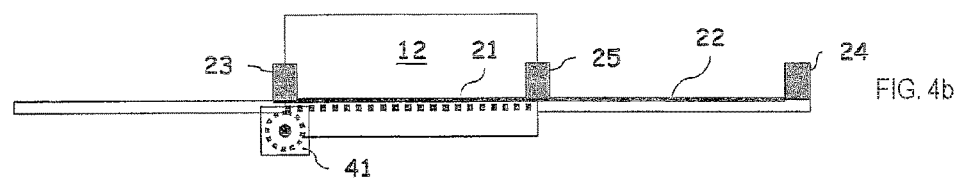
Figure 4C:
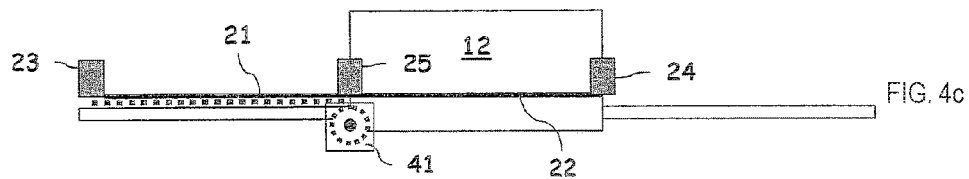

FIGS. 4b-4c depict two side views of the slider 20. In FIG. 4b, first food loading section 21 is shown to be located within cavity 12, with first and third stoppers 23, 25 positioned centrally within first and second openings 18, 19, respectively. In this position, first and third stoppers 23, 25 serve as oven covers for first and second openings 18, 19, respectively. In FIG. 4c, second food loading section 22 is shown to be located within cavity 12, with third and second stoppers 25, 24 positioned centrally within first and second openings 18, 19, respectively. In this position, third and second stoppers 25, 24 serve as oven covers for first and second openings 18, 19, respectively.

In FIGS. 4b-4c, stoppers 23-25 are shown to be positioned centrally within openings 18-19. However, during a cooking cycle, slider 20 can be moved to-and-fro slightly and repeatedly to allow the edges of two of stoppers 23-25 to be flush with openings 18-19 of housing 11. Such movements are designed to avoid overheating of a food item at any spot located directly underneath a nozzle. The distance within which slider 20 can be moved to-and-fro is preferably dictated by the widths of stoppers 23-25 in order to avoid heat loss from cavity 12 during such movements.

Referring now to FIGS. 5a-5c, there are illustrated a method of cooking when only one of food loading sections 21, 22 of slider 20 is used, in accordance with a preferred embodiment of the present invention. An uncooked raw food item (RF) is initially placed on food loading section 22 (or 21), as shown in FIG. 5a. An operator then enters an appropriate cook settings for cooking the food item via control panel 16 (or 15), and food loading section 22 (or 21) is subsequently moved within cavity 12, as depicted in FIG. 5b. After a period of time has lapsed, food loading section 22 (or 21) exits cavity 12, and the fully cooked food item (CF) is ready to be removed from food loading section 22 (or 21) by an operator, as shown in FIG. 5c.

With reference now to FIGS. 6a-6f, there are illustrated a method of cooking when both food loading sections 21, 22 of slider 20 are being used, in accordance with a preferred embodiment of the present invention. A first uncooked raw food item (RF-1) is initially placed on food loading section 22, and an operator then enters an appropriate cook setting for cooking the first food item via control panel 16, as shown in FIG. 6a. Food loading section 22 is subsequently moved inside cavity 12, as depicted in FIG. 6b. While the first food item is being cooked (F-1-C), a second uncooked raw food item (RF-2) can be placed on food loading section 21, and the operator enters an appropriate cook settings for cooking the second food item via control panel 15, as depicted in FIG. 6c. After a period of time has lapsed, food loading section 22 on which the first food item is fully cooked (CF-1) exits cavity 12 while food loading section 21 is moved inside cavity 12, as shown in FIG. 6d. While the second food item is being cooked (F-2-C), the fully cooked first food item (CF-1) is ready to be removed by the operator from food loading section 22, as shown in FIG. 6e.

While the second food item is being cooked (F-2-C), a third uncooked raw food item (RF-3) can be placed on food loading section 22, and the operator enters an appropriate cook settings for cooking the third food item via control panel 16, as depicted in FIG. 6f.

The above-mentioned sequence can be performed repeatedly for different food items. Since different cooking times can be entered by a foodservice personnel, any of the above-mentioned food items can be completely different from each other. When the cooking temperature of a to-be-cooked food item is relatively close to the temperature of cavity 12, no adjustment is typically required. When the cooking temperature of a to-be-cooked food item is higher than the temperature of cavity 12, heater 39 (from FIG. 3) will be turned on, and heated air will be directed to cavity 12 via top blower 32 and bottom blower 33 in order to increase the temperature of cavity 12. The time for heating up cavity 12 should be relatively short (i.e., no wait time) due to the placement of stopper 23-25 within openings 18-19.

When the cooking temperature of a to-be-cooked food item is lower than the temperature of cavity 12, it is important to lower the temperature of cavity 12 before starting the cooking process again, or else there may be a risk of overcooking the food item. The time for cooling down cavity 12 to the desired temperature may take several minutes, which is usually not acceptable in a fast pace commercial kitchen. Thus, the temperature of cavity 12 needs to be rapidly lowered by the following methods. If the newly entered cook temperature is approximately 40° F. (or approximately 10% in degrees Fahrenheit) less than the temperature of cavity 12, cavity's temperature can be rapidly lowered by sending either one of food loading sections 21, 22 inside cavity 12. This is because one of food loading sections 21, 22, which has been cooled by the ambient air of a kitchen, can serve as a heat sink to absorb the heat within cavity 12.

Figure 7A:
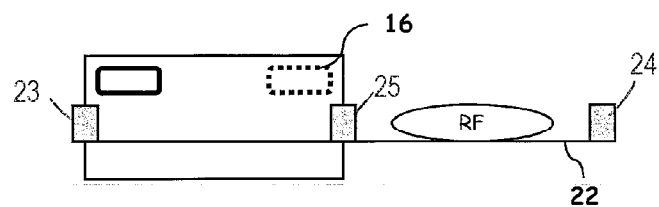
FIGS. 7a-7c illustrate a method of rapidly reducing the temperature in the cavity from FIG. 2.
Figure 7B:
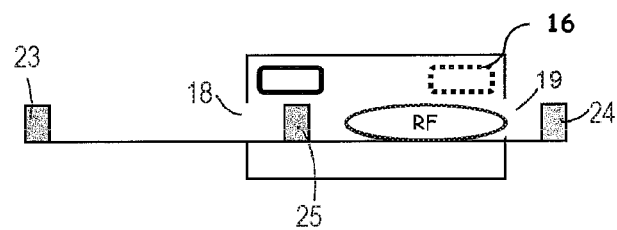
Figure 7C:
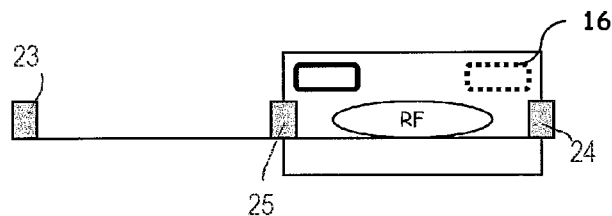

However, if the newly entered cook temperature is substantially lower than the temperature of cavity 12 (such as more than 40° F. or 10% in degrees Fahrenheit), the temperature of cavity 12 needs to be further lowered by using a different method, in conjunction with the usage of one of food loading sections 21, 22 as a heat sink, in order to avoid any overcooking. The temperature of cavity 12 can be further lowered rapidly as follows. Referring now to FIGS. 7a-7c, after a raw food item RF has been placed on loading section 22 (or 21), as depicted in FIG. 7a, a foodservice personnel can enter a desired cook temperature for cooking the food item RF via control panel 16 (or 15). If the desired cook temperature is substantially lower than the temperature of cavity 12, top and bottom blowers 32, 33 (from FIG. 3) will be activated as soon as food loading section 22 (or 21) begins moving into cavity 12. At this point, the forced air from top blower 32 and bottom blower 33 push the heated air within cavity 12 out via openings 18, 19, thereby lowering the temperature of cavity 12. Food loading section 22 (or 21) may then be moved partially but not completely within cavity 12 such that openings 18, 19 are not covered by stoppers 24, 25 (or 23, 25), as depicted in FIG. 7b. In this position, heated air within cavity 12 is allowed to escape until the temperature of cavity 12 is reduced to the desired temperature, and at which point, food loading section 22 (or 21) is moved completely within cavity 12 with openings 18 and 19 completely covered by stoppers 25 and 24 (or 23 and 25), respectively, as shown in FIG. 7c.

Alternatively, instead of waiting for the temperature of cavity 12 to drop to the desired temperature before the cooking cycle begins, the cooking cycle can start and slider 20 can be "over moved" to-and-fro repeatedly to permit the edges of two of stoppers 23-25 to travel beyond openings 18-19 of housing 11 such that hot air is allowed to escape from cavity 12, as can be illustrated by moving loading section 22 between the positions shown in FIGS. 7b and 7c repeatedly. After the temperature of cavity 12 has been reduced to the desired temperature, the normal to-and-fro movements (from FIGS. 4b-4c) by slider 20 will resume.

For much of the duration of the cook cycle, the preset temperature of matchbox oven 10 at which the temperature feedback loop operates is temporarily lowered to the new temperature entered by the foodservice personnel. Once the cook cycle is near completion, the preset temperature of matchbox oven 10 reverts back to the original preset temperature so that the next cooking cycle will not start from an unacceptably low starting temperature.

While the invention has been particularly shown and described with an exemplary embodiment, it will be understood by those skilled in the art that various changes in form and detail may be made therein without departing from the spirit and scope of the invention.

The invention claimed is:

1. An oven comprising:
    a housing having a cavity and first and second openings;
    a slider comprising a first portion for carrying a food item into the cavity through the first opening and a second portion for carrying a food item into the cavity through the second opening;
    a heat source for providing heat to the cavity for heating up any food item placed on one of the first and second portions located within the cavity;
    a blower operatively connected force heated air within the cavity to exit through the first and second openings; and
    a control panel arrangement for applying a first cook setting to the oven when the first portion of the slider is within the cavity and for applying a second cook setting to the oven when the second portion of the slider is within the cavity, wherein when transitioning to one of the first and second cook settings that has a lower temperature than the temperature in the cavity, the blower is activated to force heated air to exit the cavity through at least one of the first and second openings thereby lowering the temperature within the cavity.

2. The oven of claim 1, wherein the blower is activated to force heated air to exit the cavity after the slider moves any food item to be cooked at the lower temperature into the cavity.

3. The oven of claim 1, wherein the blower is activated to force heated air to exit the cavity before the slider moves any food item to be cooked at the lower temperature into the cavity.

4. The oven of claim 1, wherein the blower forces heated air within the cavity to exit through at least one of the first and second openings before starting a new cooking cycle when a desired temperature for the new cooking cycle is more than 40° F. lower than the temperature in the cavity.

5. The oven of claim 1, wherein the blower forces heated air within the cavity to exit through at least one of the first and second openings before starting a new cooking cycle when a desired temperature for the new cooking cycle is more than 10 percent in degrees Fahrenheit lower than the temperature in the cavity.

6. The oven of claim 1, further comprising a plurality of stoppers mounted onto the slider, wherein two of the plurality of stoppers prevent heat from escaping from the cavity through the first and second openings when one of the first and second portions of the slider is located within the cavity.

7. The oven of claim 6, wherein the slider is configured to move to-and-fro repeatedly thereby causing edges of at least one of the plurality of stoppers to travel beyond the first or second opening to allow hot air to escape from the cavity during an initial portion of a new cooking cycle, when a desired temperature for the new cooking cycle is substantially lower than the temperature in the cavity.

8. The oven of claim 6, wherein the slider is configured to move to-and-fro within a width of one of the plurality of stoppers during a cooking cycle.

9. The oven of claim 1, wherein the slider moves only linearly.

10. The oven of claim 1, further comprising a mover operatively connected to move the slider linearly in and out of the cavity through the first and second openings.

11. The oven of claim 1, wherein the control panel arrangement comprises a first control panel for entering the first cook setting; and a second control panel for entering the second cook setting.

12. The oven of claim 1, wherein one of the first and second portions is located outside the cavity when the other one of the first and second portions is located within the cavity, the first and second portions are configured wherein when located outside the cavity the portion cools and thereafter upon being moved into the cavity serves as a heat sink for absorbing the heat within the cavity.

13. The oven of claim 1, wherein one of the first and second portions is located outside of the cavity when the other one of the first and second portions is located within the cavity.

14. An oven comprising:
    a housing having a cavity and first and second openings;
    a surface that only moves linearly, wherein a first portion of the surface is located substantially within the cavity when a second portion of the surface is located substantially outside the cavity and the first portion of the surface is located substantially outside the cavity when the second portion of the surface is located substantially within the cavity;
    a heat source for providing heat to the cavity for heating up any food item placed on one of the first and second portions of the surface located within the cavity;
    a blower connected to the cavity to force heated air within the cavity to exit through the first and second openings before starting a new cook cycle when the new cook cycle has a new cook temperature that is substantially lower than the temperature in the cavity; and
    a control panel arrangement for applying a first cook setting to the oven when the first portion of the surface is within the cavity, and for applying a second cook setting to the oven when the second portion of the surface is within the cavity, wherein the first cook setting and the second cook setting are independent of each other.

15. The oven of claim 14, wherein the blower forces heated air within the cavity to exit through the first and second openings before starting the new cook cycle when the new cook temperature is more than 40° F. lower than the temperature in the cavity.

16. The oven of claim 14, wherein the blower forces heated air within the cavity to exit through the first and second openings before starting the new cook cycle when the new cook temperature is more than 10 percent in degrees Fahrenheit lower than the temperature in the cavity.

17. The oven of claim 14, further comprising a plurality of stoppers mounted on the surface, wherein two of the plurality of stoppers prevent heat from escaping from the cavity through the first and second openings when one of the first and second portions is located within the cavity.

18. The oven of claim 17, wherein the surface is configured to move to-and-fro repeatedly to allow edges of at least one of the plurality of stoppers to travel beyond the first or second opening to allow hot air to escape from the cavity during an initial portion of the new cook cycle, when the new cook temperature is substantially lower than the temperature in the cavity.

19. The oven of claim 17, wherein the surface is configured to move to-and-fro less than a width of one of the plurality of stoppers during a cooking cycle.

20. The oven of claim 14, further comprising a mover operatively connected to the surface to linearly move the surface in and out in the cavity through the first and second openings.

21. The oven of claim 14, wherein a cooled portion of the surface located outside the cavity is configured to be moved into the cavity to serve as a heat sink for absorbing the heat within the cavity.

* * * * *